March 1, 1966     LA VERN G. SOPER     3,237,924
PORTABLE MIXER

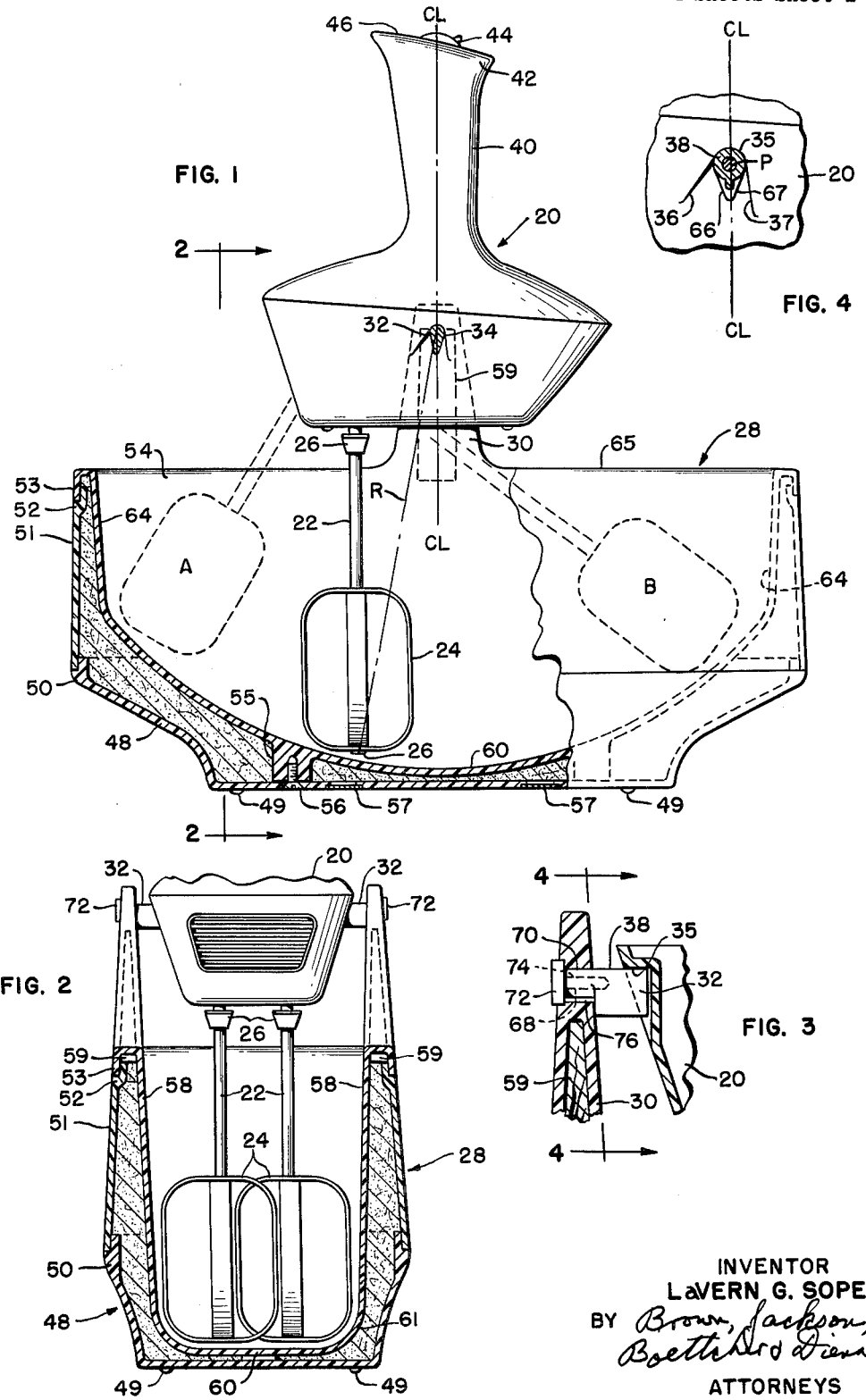

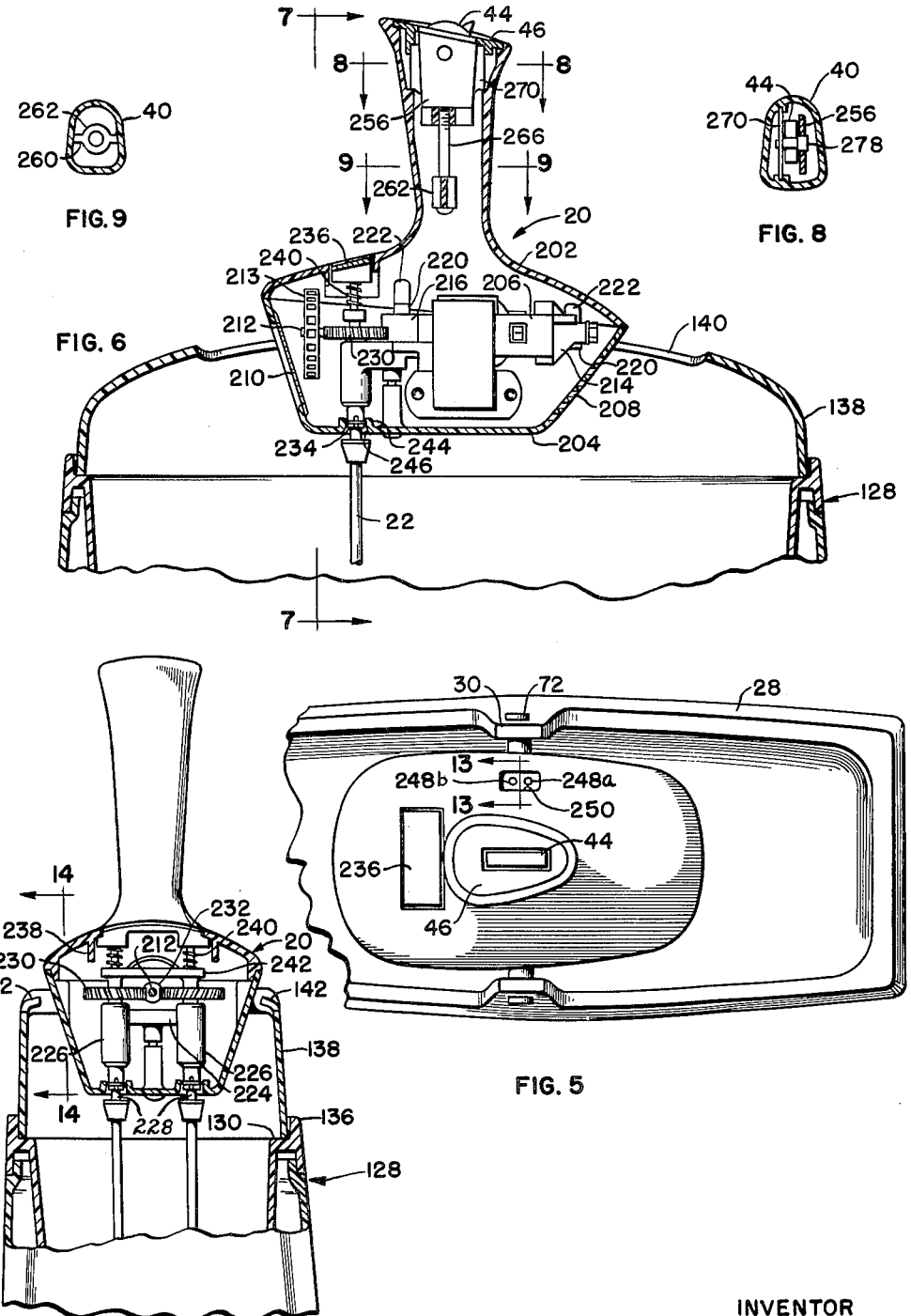

Filed Jan. 31, 1964     4 Sheets-Sheet 3

INVENTOR
LaVERN G. SOPER
BY Brown Jackson,
Boettcher & Dienner
ATTORNEYS

March 1, 1966 LA VERN G. SOPER 3,237,924
PORTABLE MIXER
Filed Jan. 31, 1964
4 Sheets-Sheet 4

INVENTOR
LaVERN G. SOPER
BY Brown, Jackson,
Boettcher & Dienner
ATTORNEYS

United States Patent Office 3,237,924
Patented Mar. 1, 1966

3,237,924
PORTABLE MIXER
La Vern G. Soper, Eau Claire, Wis., assignor to National Presto Industries, Inc., Eau Claire, Wis., a corporation of Wisconsin
Filed Jan. 31, 1964, Ser. No. 341,648
22 Claims. (Cl. 259—102)

This invention relates to electric motor driven food mixers such as are used in the kitchen of a household. More particularly, the invention comprises a novel and improved construction thereof having an associated bowl with which the mixer is used but which is also convenient to use detached from the bowl. The invention also contemplates a novel construction of bowl having means by which the mixer may be operatively mounted thereon and without benefit of external supports.

A principal object of the invention is to provide a novel construction of bowl and mixer which assures a thorough and complete mixing, whipping and/or beating of the ingredients added to the bowl.

Prior to my invention, a portable food mixer of the domestic culinary type was commonly hand-supported over the bowl or other container and moved through or about the ingredients placed therein for whipping or mixing. In a more elaborate form, the mixer had been supported on a stand with its beating elements depending into the bowl, and the bowl slowly rotated either by hand or otherwise. To obtain a more thorough mixing of the ingredients, it also had been proposed to rotate the bowl about a vertical axis offset from the beaters.

It is a feature of the present invention, however, that the bowl and mixer are so adapted that the mixer is detachably supported on the bowl itself and so that the mixer with its beater elements which depend into the bowl can be rocked about a horizontal axis, and the interior of the bowl is given a shape corresponding to the width and extent of the arc or path through which the beater elements move as the mixer is rocked.

In one form of the invention, the interior of the bowl has a generally cylindrical bottom surface and a pair of essentially planar upstanding walls between which the beaters of the mixer depend. For this purpose the bowl is provided with a pair of spaced horizontally disposed and aligned pivot members arranged on said side walls or vertically extending projections thereof, and the mixer having suitably located bearing recesses on its two sides to receive said pivot members. The spacing between the two walls only slightly exceeds the travel width of the beater elements and the pivot members are located at the axis of revolution of the cylindrical bottom wall surface wherefor as the mixer is rocked on said pivot members, the beaters move through the entire width and breadth of the batter. In another form of the invention, the bowl is provided with a transparent cover having a centrally located opening in the top thereof to receive the mixer. In this form, the cover is provided with the pivots on which the mixer is supported for rocking movement.

Another feature of the invention is the provision of a mixer as aforedescribed having an upstanding hand grip portion disposed centrally of the top surface of the casing which encloses its motor. This enables the user to conveniently rock the mixer and its beater elements about the horizontal pivots by exercising a to and fro movement of his arm through an essentially horizontal plane and one normal to his grasp of the handle. This motion of the arm which is also normal to the axis about which the mixer rocks and parallels the direction of movement of the beater elements, is easily practiced without exerting strain or cramping of the wrist and from a natural and comfortable position of the arm. Furthermore, when the mixer is used apart from the bowl as, for example, to stir the contents of a kettle cooking on the stove, the mixer can be grasped and its beater element operated through the bettle contents in the same comfortable, uncramped natural manner.

Still another feature of the invention is the location of the motor energizing switch in the top end of the hand grip portion where it may be conveniently manipulated by the thumb when the mixer is grasped and operated as aforedescribed.

Thus a feature of the invention is that operation of the mixer, be it supported on the pivots of the associated bowl or hand-supported apart therefrom, can be carried out with one hand, leaving the user's other hand free for example to pour further ingredients into the mix, turn the pages of a recipe book or even hold the telephone.

Still another feature of the invention is the arrangement of the mechanical components of the mixer including the motor, its drive shaft, associated gearing, beater elements, et cetera, in such relation that the center of gravity of the mixer is below the bearing recesses in its sidewalls and thereby the pivots on which the mixer is supported on the bowl. This has the advantage first of facilitating the rocking movement of the mixer about the pivots when used with the associated bowl. It also provides a balanced device when hand manipulated apart from said bowl. A further advantage thereof is that when supported on the bowl pivots, the mixer stands freely in a vertical position.

Other features of the invention include:

The bowl and mixer comprise a complete unit which may be used together without the requirement of a separate stand, extra fittings or supplementary attachments. At the same time the mixer is completely portable and may be readily detached for use apart from the bowl.

The handle and pivot recesses are shaped and located for ease of operation and maximum utility both with and when apart from the bowl.

The bowl has a double wall construction which gives the effect, but not the reality, of weight and mass. It further affords variation in the external shape and surface treatment of the bowl because the outer wall is independent of the functional limitations of the inner wall.

Because the inside width and arc of the bowl correspond to the working radius of the beaters, the beaters contact practically all the media in the bowl with each rocking stroke of the mixer. Consequently, because of the thorough mixing action thus achieved, the mixing cycle for cake batters, etc. is shortened.

All of these features and/or advantages are obtained, while simultaneously the design of the mixer and particularly its handle, make for an electric mixer that is considerably more maneuverable when used apart from the bowl than mixers provided with prior art basket type handles. At the same time, the invention provides a construction of mixer and bowl which is simple and economical as well as practical to manufacture, assemble and use.

Many other objects, advantages and/or features will be at once apparent or will become so from the more detailed description of a preferred form of the invention and modifications thereof as will be hereinafter described when considered with the figures of the accompanying drawing.

It further is to be understood that said description is not to be taken in a limiting sense but merely as illustrative in the invention and forms which it may take.

Referring therefore to the several views which comprise the drawings and wherein like parts are identied by like reference numerals:

FIGURE 1 is a side elevation view of one embodiment portrayed to illustrate the invention;

FIGURE 2 is a transverse sectional view taken through the embodiment along lines 2—2 of FIGURE 1 looking in the direction indicated by the arrows;

FIGURE 3 is an enlarged fragmented view taken of one of the upright bowl stanchions on which the pivot means are mounted and shows how the mixer is detachably supported on said pivot means for rocking movement about the horizontal axis of said pivot means;

FIGURE 4 is a fragmentary transverse sectional view taken along lines 4—4 of FIGURE 3 to show details in construction of the pivot means, its mounting on the stanchions and how it supports the mixer for limited rocking movement;

FIGURE 5 is a top plan, partly fragmented view of the embodiment illustrated by FIGURES 1–4;

FIGURE 6 is a longitudinal vertical sectional view illustrating a second embodiment of the invention, and also shows internal details of the mixer such as the motor and drive mechanism for operating the beater elements;

FIGURE 7 is a transverse sectional view taken along lines 7—7 of FIGURE 6 and looking in the direction indicated by the arrows;

FIGURE 8 is a transverse sectional view taken along lines 8—8 in FIGURE 6;

FIGURE 9 is a transverse sectional view taken along lines 9—9 in FIGURE 6;

FIGURE 24 is a view taken along lines 24—24 in FIGURE 23 looking in the direction indicated by the arrows.

Figure 24:
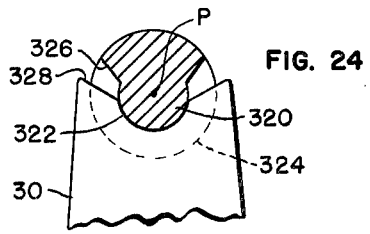
FIGURES 23 and 24 are views showing a still further arrangement wherein the mixer is provided with the pivot pins and the bowl has arcuate seats in which detachably rest said pivot pins.

In FIGURE 1, 20 represents a portable electric mixer having a pair of spindles 22 which depend from the forward end of its underside and support beater elements 24 at their lower end. Spindles 22 and their respective beater elements 24 are axially rotated by a suitable motor and associated drive mechanism contained within the mixer casing as will be later described in greater detail. Spindles 22 are also provided with appropriate batter guards at 26.

In accordance with the invention, provision is made for detachably supporting mixer 20 on bowl 28 so that its spindles 22 and their beater elements 24 as they are axially rotated may be also moved to and fro through the batter or other contents of the bowl 28, as by rocking the mixer about a horizontal axis indicated at P in FIGURE 1. For this purpose, in the embodiment according to FIGURES 1–5, bowl 28 includes a pair of vertically aligned uprights or stanchions 30 from the inner surface of which project means in the form of aligned horizontally disposed pivot pins 32 of generally wedge-shape in cross section. Mixer 20, in turn, has a pair of aligned recesses 34 in its two sidewalls which are located midway between the front and rear ends of the mixer casing and above the center of gravity of the mixer. These recesses serve as means by which the mixer is rockably supported on bowl 28 and so that is beater elements 24 protrude into the bowl. As best shown in FIGURES 3 and 4, the walls of recesses 34 comprise a cylindrically shaped intermediate surface 35 which rests on the upper surface 38 of the pivot pins 32 and have outwardly diverging generally planar side surface portions 36 and 37 which make it convenient for seating and unseating of the mixer 20 by means of said recesses 34 on the pivot pins 32. Both said intermediate surface portion 35 of the recesses 34 and the upper surface 38 of the pivot pins comprise portion of cylinders, the axes of which coincide and are represented at P in FIGURE 4. P therefore represents the axis or center about which the beater elements swing as when mixer 20 is rocked by a push-pull action on the mixer's handle 40. Cylindrical surfaces 35 and 38 by reason of their angular extent and width provide a wide area continuous sliding contact during the pivotal action so that the rocking of mixer 20 on pins 32 is smooth and obtained with a minimum effort on the operator's part. As shown in FIGURE 1, handle 40 extends vertically, is elongated in form and has sufficient bulk that it can be conveniently and comfortably grasped by closing the fingers of one hand thereabout. Also, as seen from FIGURE 1, its longitudinal axis is disposed along center line CL—CL of the mixer so that when assembled with bowl 28 it intersects the horizontal axis P about which the mixer is intended to rock on pins 32. The mixer may therefore be rocked by a to and fro movement of the arm throuh an essentially horizontal plane and while grasping the handle in a comfortable and relaxed manner. It is also located immediately above the center of gravity of the mixer so that when the mixer is used separately from the bowl the weight distribution is such that the mixer can be easily moved through a pan or other utensil in which the mixer is being operated. The upper edge 42 of the handle may be flared slightly since this helps in locating the fingers about the handle. For convenience, switch 44 for operating the mixer motor is located in the upper surface 46 of the handle where it may be thumb-operated.

Mixing bowl 38 is molded or otherwise constructed of opaque plastic or other suitable material, and as illustrated in FIGURE 1 is formed in three parts which are then assembled and joined into the illustrated unitary structure. These comprise an outer or pedestal section 48 having appropriately located feet 49 and an outwardly flared upper edge 50 recessed to provide a seat in which is received the lower edge of an annular section or shroud 51. Shroud 51 also has a recessed upper edge 52 in which seats the downwardly turned lip or flange 53 of the inner bowl section 54. Although the meeting edges of the two bowl sections may be joined together in any appropriate manner as by adhesive or welding, preferably, inner bowl section 54 is provided with a pair of internally threaded bosses 55 into which screws 56 are threadedly connected so that the three sections 48, 51 and 54 are tightly drawn together. The space between the bowl sections may be filled with an insulating porous material such a styrofoam. The styrofoam may be inserted through suitable ports in the bottom wall of pedestal section 48, which are afterwards sealed by discs 57.

Although outer bowl sections 48 and 51 may be of any suitable thermoplastic material such as polystyrene, the inner bowl section 54 may be of a more durable thermoplastic material such as polycarbonate resin which has good resistance to abrasion and heat.

Inner bowl section 54 defines the novel interior shape of a mixing bowl according to the present invention and which is independent of the exterior shape of the bowl. This shape as shown comprises a pair of vertically rising opposed planar walls 58 which are disposed in essentially parallel spaced relation (FIGURE 2) and from which the aforementioned uprights 30 rise midway of the two ends of the bowl. If desired or found necessary reinforcements such as wooden rods 59 may be inserted within the hollow of uprights 30 to stiffen the same. The bottom wall 60 of the inner bowl section 54 comprises a fraction of a cylinder, the curvature of which corresponds to an arc having its axis at P which is at right angles to side walls 8 and a radius R which only slightly exceeds the distance between the lower ends 62 of the beater elements 24 and the axis of the cylindrically curved surface 35 of recesses 34. Vertical walls 58 are furthermore spaced apart just sufficient to provide clearance for the beater elements in the rocking of the mixer about pins 30. Preferably, they also merge with the cylindrical bottom wall 60 along short arcs 61. The interior of bowl 28 may therefore be described as including a section of a cylinder whose axis is at P about which the mixer and thereby its beater elements 24 rock and whose length corresponds to the width of the path traversed by the beater elements 24 in their rocking about pivotal axis P. As shown, bottom wall 60 of the inner bowl section extends through approximately a quadrant or 90° of a full circle. The inner bowl section 54 also has vertically extending end walls 64 of essentially planar parallel disposition. However, if desired, the cylindrical curved shape of the bottom wall 60 may be extended to the bowl's upper edge 65 and in which event planar end walls 64 would be omitted. The inside width of bowl 38 being therefore only slightly wider than the two side-by-side beater elements 24 and because the cylindrical shape of its bottom wall 60 complements the working radius of the beater elements as the mixer is rocked on pivot pins 30 about axis P, the beaters contact practically all of the batter within the bowl in each rocking stroke of the mixer, and so a thorough mixing or beating of the batter can be assured.

Considering now FIGURES 3 and 4 in particular, although pivot pins 32 can be formed as integral portions of the bowl uprights 30, it is preferred to separately cast pins 32 of aluminum or other light weight, wear resistant metal. As previously described, pins 32 are of wedge-shape in cross section so that they include a cylindrical top surface 38 defined about P as a center axis and downwardly converging generally planar sides 66 and 67 which are respectively engaged by surfaces 36 and 37 of recesses 34 in the rocking of the mixer to function as stops which define the angular limits through which the beater elements may be swung about axis P. Pins 32 are further provided with a cylindrical mounting stud portion 68 which is located in openings 70 provided through the bowl uprights 30 and secured in place by screws 72 which are threadedly connected into internally threaded bores 74 provided in the outer ends of mounting studs 68. To prevent turning of pins 32 in openings 70, stud portions 68 are provided with axially extending key 76 which fits in a provided keyway 78 as illustrated; mounting stud 68 and its receiving opening 70 could also be given a non-circular shape in cross-section which would inhibit turning of pins 32.

As aforedescribed, the converging sides 66 and 67 of pivot pins 32 act in cooperation with the diverging sides 36 and 37 of recesses 34 as stop means which limit the extent or arc through which mixer 20 can be rocked on its pivotal connection with bowl 28, and so prevent the operator from rocking the mixer too far and therefore inadvertently disconnecting the mixer from the supporting pivot pins 32. Also since their presence lends confidence to the operator that she cannot rock the mixer too far, she is encouraged to move the beater elements 24 through the full arc represented by the bottom wall 60 of the bowl. Experience thus far has indicated that if the angular extent of the arcuate path through which the beater elements 24 are moved is about 90°, or one quarter of a circle, a maximum quantity of batter can be contacted by the beater elements without taxing the operator. However, as will be seen in FIGURE 1, because spindles 22 are located forwardly of the vertical center line CL—CL of the mixer which includes its handle 40, as well as pivot axis P, handle 40 needs to be pulled back from its stable position over P a shorter distance than it needs to be pushed forward from said position in order to move the beater elements through the limits of a 90° arc which corresponds to the angular extent of the bowl's bottom wall 60 and which is represented by the dotted line showings of the beater elements at A and B. This is taken into consideration when relating the angular divergence of walls 36 and 37 of recesses 34 in the mixer casing to the angular convergence of the sides 66 and 67 of the pivot pins 32. Thus where the extent of the bottom wall 60 of the bowl comprises 90°, it has been found convenient to dispose surfaces 66 and 67 of the pivot pins at approximately 22° with respect to a vertical plane including axis P or at 44° with respect to each other. Then by disposing surface 37 of recess 34 at 11° with respect to vertical center line CL—CL and its surface 36 at 35° with respect to said vertical center line, the rocking of the beater elements will be restricted to an arc, the termini of which are 90° apart as represented by positions A and B of the beater elements in FIGURE 1. This follows because in the forward stroke of the beater elements 24, they will move 22°+11° or 33° past their illustrated stable at-rest position before surface 37 of recesses 34 engage surface 67 of the pivot pins 32 and on the return stroke will move 22°+35° or 57° beyond said stable position before surfaces 36 and 66 of the recesses and pivot pins meet. Obviously, if the beater elements were displaced a different angular distance forwardly of vertical center line CL—CL or a different length of rocking stroke was required, other angular dispositions of surfaces 66, 67 and 36, 37 would be required. Moreover, if surfaces 66 and 67 were differently angled than as described corresponding changes in the angular disposition of recess walls 36 and 37 would be utilized to limit the angular movement of the beater elements to the selected 90°. This would also be the case if some other angle of beater travel were selected.

Figure 22:
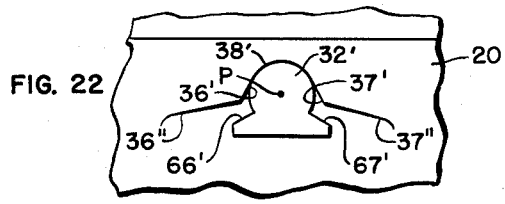
FIGURE 22 is a view showing still another arrangement for pivotally supporting the mixer on the bowl.

Other arrangements of, and differently constructed stop means also can be employed to limit the angular movement of mixer 20 about its pivotal connection on bowl 28. For example, only one of the pivot pins 32 might be of the described wedge-shape in cross section to have stop surfaces 66 and 67, and in which case the other pivot pin might have a full cylindrical shape. Also for example, as illustrated in FIGURE 22, one or both of the pivot pins and their associated recesses provided the mixer might be reshaped so that the pivot pin there represented as 32' would have its top cylindrical surface 38' comprising considerably more than 180° although less than 360° and have wings providing outwardly but downwardly diverging surfaces 66' and 67' against which end walls 36' and 47' of recess 34' engage, portions 36" and 37" providing clearance for said rocking action. Again, however, the angular displacement of stop walls 36" and 66' and stop walls 37" and 67' would be calculated and determined in accordance with the extent of travel required to move the beater elements 24 from their stable at-rest position to their respective forward and rear positions A and B (FIGURE 1).

Figure 23:
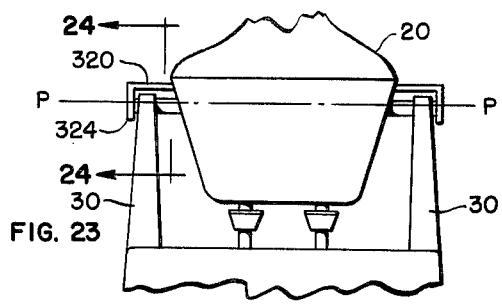

Also the pins might be formed on the casing of the mixer as shown at 320 in FIGURE 23. Pins 320 would be of cylindrical shape so as to removably seat in bearing recesses 322 provided in the upper ends of the bowl uprights 30. Recesses 322 have curved bottom walls corresponding to the cylindrical shape of pivot pins 320 and so as to accommodate rocking movement of the mixer 20 about axis P. The outer ends of pins 320 may be flared as at 324 and also have wings 326 projecting from opposite sides thereof which serve as stops which engage the appropriately inclined top edges 328 of uprights 30 on either side of bearing recesses 322 and whereby to limit the extent of the rocking action of the mixer as aforedescribed.

Figure 14:
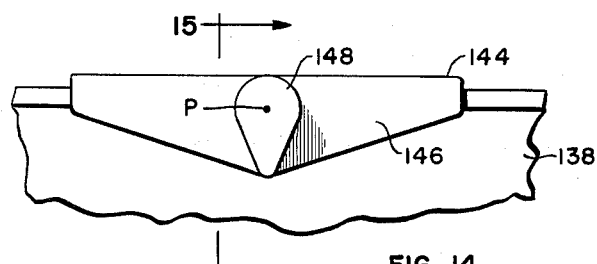
FIGURE 14 is a fragmented side elevational view taken along lines 14—14 of FIGURE 7 to illustrate the pivot means and mounting thereof on the bowl cover.
Figure 15:
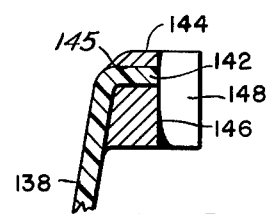
FIGURE 15 is a sectional view taken along lines 15—15 of FIGURE 14.

Referring next to FIGURES 6 and 7 a further embodiment of the invention is there illustrated wherein mixer 20 is detachably supported on a bowl 128 for similar rockable movement of its beater elements 24 through the batter content of the bowl. Bowl 128 is shown constructed of two parts (the annular shroud section and inner bowl section being molded in one unit) however generally the same exterior and the same interior shape as described for bowl 28. However, unlike bowl 28, bowl 128 does not have integrally related uprights or stanchions 30 and instead has a continuous ledge 130 about its upper edge 136 on which removably seats the lower edge of its cover 138. Cover 138 is preferably molded of a transparent rigid heat-resistant plastic for "see through" operation and has a centrally-located rectangular shaped cutout or opening 140 through which mixer 20 extends. Considering now FIGURE 7 and FIGURES 14 and 15 therewith, it will be seen that portions 142 of cover 138 along the two sides of its cutout 140 are disposed generally horizontally and support bearing blocks 144 midway of the two ends of said cutout 140. Bearing blocks 144 are molded of a similar plastic material and include an essentially planar vertically disposed surface 146 from which projects an integrally related pivot portion 148 having a generally wedge-shaped cross section and corresponding in dimensions, contour and function to pivot pins 32 of the first-described embodiment (FIGURES 1–5). The opposite side of said blocks 144 are longitudinally recessed as at 145 by means of which they are assembled over edge portion 142 of the cover 138 and fused or adhesively secured thereto, it being understood that blocks 144 are so arranged that their surfaces 146 lie in spaced parallel vertical planes and pivots 148 are properly aligned with each other and also disposed midway of the cutout 140 and thereby bowl 128 when properly assembled therewith. It will also be understood that the dimensions of cutout 140 are carefully related so that pivot portions 148 will properly engage in recesses 34 of the mixer when it is positioned thereon and also so that there will be sufficient room to accommodate the rocking movement of mixer 20 about pivot portions 148. Thus in one respect, cover 138 functions as did the uprights 30 of bowl 28 in the first described embodiment to provide structure on which pivotal means for supporting mixer 20 can be located at the required height above the bowl and so that its beater elements 24 will closely traverse the two sides and bottom of the bowl when rocked about axis P which pivot pins 32 (FIGURES 1–5) and pivot portions 148 (FIGURES 7, 14, 15) define. At the same time cover 138 provides the further advantage of preventing accidental spattering of the batter outside the bowl during operation of the mixer and also guards against accidental dropping of foreign matter into the batter.

Figure 16:
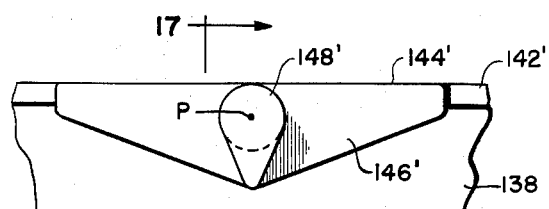
FIGURE 16 is a view generally similar to FIGURE 14 and shows an alternate form of pivot means.
Figure 17:
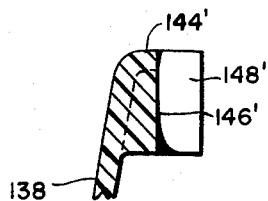
FIGURE 17 is a sectional view taken along lines 17—17 of FIGURE 16.

Blocks 144 and their pivot forming projections 148 can also be integral with cover 138. Such a construction is illustrated in FIGURES 16 and 17 wherein 144' represents a thickened portion of edge 142 of bowl 138 and the front surface 146' of which is planar, lies in a generally vertical plane and includes a generally wedge-shaped pivot forming projection 148'. In other respects elements 144'–148' correspond to the elements 144–148 as described in connection with FIGURES 6, 7, 14 and 15.

Figure 18:
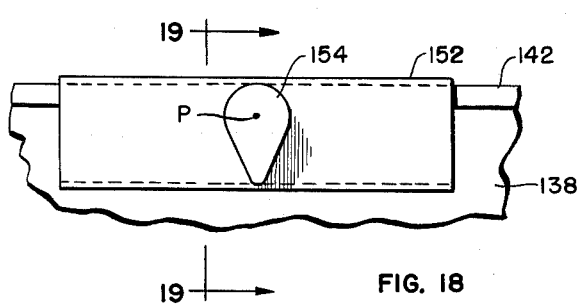
FIGURE 18 is a view generally similar to FIGURE 14 showing still another form of pivot means.
Figure 19:
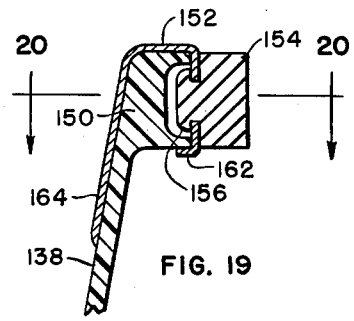
FIGURE 19 is a sectional view taken along lines 19—19 in FIGURE 18.
Figure 20:
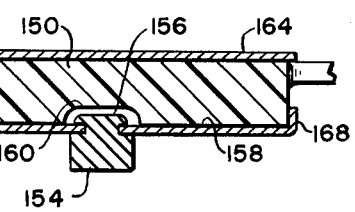
FIGURE 20 is a sectional view taken along lines 20—20 in FIGURE 19.

FIGURES 18, 19 and 20 show still another arrangement wherein edge 142 of bowl 138 is thickened at 150 about which a fabricated piece 152 of aluminum or other light weight shape retaining metal may be folded. As illustrated by FIGURES 19 and 20, metal piece 150 provides support for pivot constituting portion 154 having a shank portion 156 passed through a provided opening and flattened thereover, the front surface 158 of thickened section 150 being essentially planar and vertically disposed to provide a locating seat for portion 154. Surface 158 is also recessed at 160 to provide clearance for the flattened end of its shank 156. Usefully piece 152 is dimensioned large enough that one end may be folded under thickened section 150 as at 162 and its other end extended over the thickened portion 150 and down the outside of cover 138 for a substantial distance below the lower extent of section 150 as is illustrated at 164. Also, as illustrated in FIGURE 20, piece 152 is wide enough to allow side portions 166 and 168 thereof to be wrapped around the two ends of thickened section 150. Also, piece 152 may be adhesively secured to the surfaces of cover 138 and its thickened section 150 which it engages when folded thereabout as described above.

Figure 21:
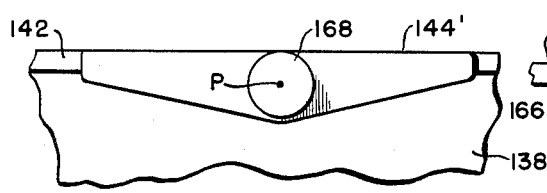
FIGURE 21 is a view showing still another form of pivot means.

FIGURE 21 shows still another arrangement wherein the construction is generally similar to that illustrated by FIGURES 16 and 17. However, the pivot bearing projection 148' is replaced by a pivot bearing projection 168 which is of true full cylindrical shape. This embodiment of the invention provides for the datachable mounting of mixer 20 by means of its recesses 34 for rocking movement about axis P but without provision for limiting the extent of the arcuate path through which the mixer and its beater elements can be rocked about said axis.

Referring now to FIGURES 6 through 13, further details in the construction of mixer 20 will now be described. As shown best in FIGURES 6 and 7, mixer 20 comprises an upper casing section 202 and a lower casing section 204. Upper casing section 202 includes handle 40 and supports an electric motor 206, associated transmission means by means of which it turns spindles 22 and also the electric circuitry including switch 44. Lower casing section 204 is removably attached to the upper casing section as will be later described and contains venting means at 208 and 210 to permit the circulation of air around the motor 206. Motor 206 may be a series-wound, horizontally disposed A.C. 60 cycle motor of conventional construction having one end of its arbor 212 rotatably journalled in bearing 214, the other end of its arbor extending through bearing 216 and having flywheel 213 mounted thereon. Bearings 214 and 216 constitute mounts to which the casing of motor 206 is attached and include two pairs of vertically apertured bosses 220 disposed on either side and at opposite ends of the motor 206 (only two of which are shown in FIGURE 6) and which are aligned with the internally threaded vertical bores of bosses 222 molded integrally with casing section 202 to receive mounting screws by which motor 206 and bearings 214, 216 are secured to said upper casing section 202.

Secured to the housing of journal bearing 216 and by connecting cross brace 224 are a pair of spaced vertically extending journal bearings 226 in which a pair of shafts 228 are rotatably and axially-slidably supported. Above journal bearings 226, shafts 228 are keyed to gears 230 which mesh with worm 232 on motor shaft or arbor 212 so as to be rotated with operation of motor 206. The lower ends of shafts 228 are bifurcated to receive the tongue-like formation 234 on the top end of beater spindles 22 so that the latter may be frictionally attached thereto and to turn with motor 206. The upper ends of shafts 228 are connected to depress element 236 which is guided by depending walls 238 against the resistance of springs 240 encircling shafts 228 and resting on connecting cross piece 242. As shown in FIGURE 6, the lower bifurcated end of shafts 228 in their normal position are surrounded by an upwardly flanged part 244 about opening 246 in the bottom of lower casing section 204. However by depressing on element 236, shafts 228 are moved downwardly so that their bifurcated ends extend clear of said flange and so accommodate more ready separation of tongue 234 of the beater spindles 22 from the enclosing grasp of the bifurcated end of shafts 228. On release of pressure on element 236, springs 240 act to return shafts 228 to their normal position as illustrated. Any other appropriate arrangement for detachably connecting spindles 22 to shafts 228 may also be utilized.

Power to operate motor 206 may be supplied from ordinary house current comprising 110–120 volts 60 cycles A.C. For this purpose, mixer casing section 202 has a pair of spaced prongs 248a, 248b (FIGURE 13) provided in recess 250 in the top surface thereof adjacent one side and above axis tP and which are adapted to be connected into the sockets in the plug of a conventional cord and plug set (not shown) to establish electrical connection with the power source. One of said prongs 248a has its inner end connected to conductor 252 (FIGURE 13) which leads to one side of motor 206. The other prong 248b has its inner end connected to conductor 254 which leads to switch 44, details of which will now be described.

Figure 11:
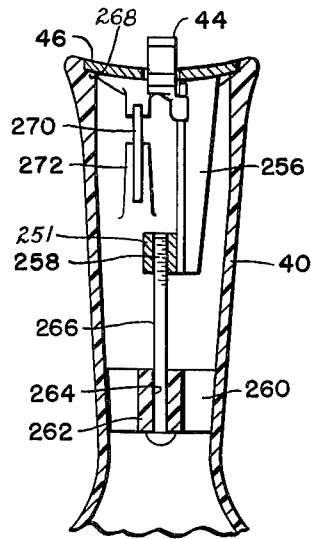
FIGURE 11 is a vertical section taken through the handle along lines 11—11 of FIGURE 10 and at right angles to that illustrated in FIGURES 6 and 10.
Figure 13:
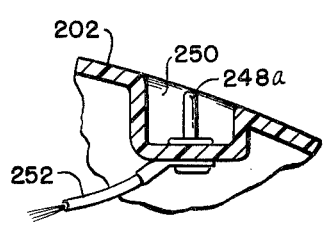
FIGURE 13 is a sectional view taken along lines 13—13 of FIGURE 5.

Referring now to FIGURE 11, handle 40 is hollow and its open top end is closed by cover 46. Integral with cover 46 is a depending L-shaped extension 256 having a horizontal part 251 provided with an internally threaded bore 258. Below said horizontal part 251 is web 260 extending across the hollow interior of handle 40 and integrally connected therewith. Web 260 is enlarged at 262 midway at its ends and its portion 262 has a bore 264 with which bore 258 in horizontal part 251 is aligned to receive a connecting bolt 266, the threaded end of which is threadedly connected into bore 258 so as to draw cover plate 46 tightly against receiving marginal recess 268 in the upper edge of handle 40 and so secure the cover plate 46 in place.

Figure 10:
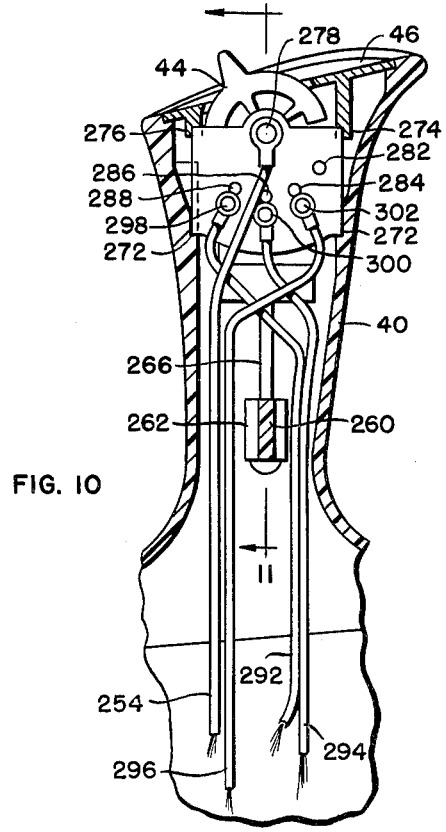
FIGURE 10 is a vertical sectional view taken through the handle of the mixer to show details in construction of the motor switch and its mounting, said view being taken from the side opposite that illustrated in FIGURE 6.
Figure 12:
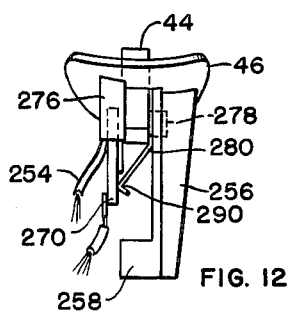
FIGURE 12 is a view illustrating the switch components separated from the handle.

Opposite extension 256 is a mounting plate 270, the lower edges of which engage on ledges 272 (FIGURES 10 and 11) and the upper edges of which are received in recesses 274 provided in depending portions 276 of cover plate 46. Tightening of bolt 266 therefore serves also to hold plate 270 in place when properly located in said recesses 272 and 274. Between mounting plate 270 and vertical extension is switch 44 shown rotatably connected to turn about a pin 278. As shown best in FIGURE 10, conductor 254 is secured to the top of plate 270 and is electrically connected to contactor spring 280 (FIGURE 12) which is shown mounted on switch 44 to move with its turning about pin 278. At 282, 284, 286 and 288 are four openings arranged in an arc whose center is pin 278, and so that as switch 44 is actuated or turned about pin, the bent end 290 of contactor spring 280 (FIGURE 13) will successively engage in said openings. Referring still to FIGURE 10, it will be seen that conductors 292, 294 and 296 are each secured at one end to plate 270 and immediately below openings 288, 286 and 284 respectively, and in such manner that their respective connectors 298, 300 and 302 protrude into respective openings 288, 286 and 284 so as to be contacted by end 290 of contactor spring 280 when it is received in said openings. Motor 206 is of the tapped field winding type, conductor 296 being connected to the field windings of the motor so that all of the field windings is in series with the motor armature. Under this condition, with switch 44 set so that end 290 of contact spring 280 engages in opening 284, a circuit is established from prong 248b, through conductor 254, contactor spring 280, its end 290 in contact with contactor 302, conductor 296, the field winding of motor 206, its armature, conductor 252 to prong 248a. In this setting of switch 44, therefore low current flows and the motor operates at low speed. Conductor 294 however is tapped into the field winding of motor 206 so that a portion of the field winding is cut out. Consequently when switch 44 is set so that end 290 of contactor spring 280 engages in opening 286, more current will flow and the motor operates at its medium speed setting. Conductor 296 is tapped into the field winding so that a still greater proportion of the field winding is cut out and therefore when switch 44 is set so that end 290 of contactor spring 280 engages in opening 288, there is a still greater flow of current and the motor operates at its maximum speed setting. Of course, when switch 44 is set so that end 290 of contactor spring 280 engages in opening 282, the motor circuit is interrupted and it does not operate. Any other arrangement and/or ciricitry for adjusting the speed of motor 206 to vary the rate at which beater elements 24 are rotated may be utilized, the above described arrangement however being preferred.

As described above, it will be apparent that all the objects, features and advantages recited for the invention have been demonstrated as obtainable in a convenient and entirely practicable structure both to manufacture and to use.

Mixer 20 is completely portable so that it may be mounted on pivot pins 32 of bowl 28 (FIGURES 1–5) or on the pivot bearing projections provided cover 138 of bowl 128 (FIGURES 6 and 7) and in accordance with any of the arrangements described in connection with FIGURES 14–24. In each of the described embodiments of the invention, mixer 20 is adapted to hang freely on pivot pins or projections 32, 32′, 148, 148′, 154 or 168 as the case may be and with its beater elements depending vertically into the bowl. This is obtained because of the weight distribution of the mixer so that its center of gravity lies centrally of its ends and below axis P.

To use the mixer when properly assembled on either bowl 28 or 128 as described, the operator needs only to grasp the mixer by its handle 40 utilizing one hand, push switch 44 by the thumb of her hand grasping the mixer handle to the desired mixer speed, and then as the beater elements 24 rotate about the axis of spindles 22, rock the mixer to and fro about its pivotal connection with the bowl using a comfortable to and fro motion of her arm through an essentially horizontal plane. As previously suggested she may perform this from either a standing or sitting position to suit her convenience and without having to cramp her wrist into an unnatural, uncomfortable and therefore tiresome grip about the handle. The shape and bulk of bowl 28 and also 128 is also conductive to a stable support of the mixing action so that neither does the operator have any problem in holding the bowl still during the rocking of the mixer on its pivots.

The mixer is also readily detached from the bowl by merely lifting it off the pivots and the beater elements 24 and their spindles 22 may be detached from the mixer for storage or cleaning by simply depressing element 236 on the top of casing section 202 and pulling on the spindles 22. To reassemble, the tongue-like projections 234 on the top end of the spindles are merely aligned with the slots in the lower end of shafts 238 and pushed until frictionally caught.

Mixer 20 also may be used detached from the mixing bowl as when one wishes to stir the contents of a pan or other utensil cooking on the stove. When used separately of the bowl the vertical, upright disposition of its handle 40 also provides advantages over conventional portable mixers having a horizontally disposed handle by way of greater comfort in grasping the handle and supporting the mixer as well as in moving its beater elements about and through the cooking contents of the utensil.

Having described my invention, I claim:

1. In combination, a mixing bowl, an electric mixer having beaters depending therefrom, and means supporting the mixer on said bowl for rocking movement about a horizontal axis with the beaters extending into the bowl, the interior of said bowl corresponding generally to the radius and width of the path through which the lower edge and sides of the beaters move when rocked on said pivot means.

2. In combination, a mixing bowl, an electric mixer having beaters depending therefrom, said mixer being detachably supported on the bowl for rocking movement about a horizontal axis with the beaters extending into the bowl, the interior of said bowl corresponding generally to the radius and width of the path through which the lower edge and sides of the beaters move when rocked on said pivot means, and means limiting the angle through which the mixer may be rocked about said pivot means.

3. In combination, a bowl having a cylindrically shaped inside bottom wall and a pair of oppositely disposed generally planar inner sidewalls, a portable motor-driven mixer, means pivotally supporting said mixer above said sidewalls so as to be rockable about the axis of said cylindrically shaped bottom wall, said mixer supporting beaters depending therefrom to extend across essentially the space between said sidewalls, and means for limiting the extent of rocking of the mixer about said pivot means.

4. In combination, a bowl having a cylindrically shaped inside bottom wall and a pair of opposed generally planar inner sidewalls, a portable motor-driven mixer pivotally supported between said sidewalls so as to be rockable about the axis of said cylindrically shaped bottom wall, said mixer having beaters depending therefrom which extend across essentially the width of the space between said sidewalls, and means for limiting the angle through which the mixer rocks.

5. In combination, a bowl having a cylindrically shaped inside bottom wall and opposed generally planar inner sidewalls, a portable motor-driven mixer pivotally supported so as to be rockable about the axis of said cylindrically shaped bottom wall, and said mixer supporting beaters depending therefrom to extend across essentially the width of the space between said sidewalls.

6. In combination, a bowl having a concave shaped inside bottom wall and a pair of opposed generally planar inner sidewalls, a portable motor-driven mixer, means pivotally supporting said mixer on said bowl so as to be rockable about a horizontal axis spaced above said bottom wall, said mixer supporting beaters depending therefrom to extend across essentially the space between said sidewalls, and the concave shape of said bottom wall of the bowl corresponding generally to the shape of the arc through which the mixer rocks about said axis, said mixer having a handle upstanding centrally of its top side and radially of said axis about which the mixer rocks, the center of gravity of the mixer being below said axis and adjacent the center line of said handle.

7. In combination, a bowl having a cylindrically shaped inside bottom wall and a pair of opposed generally planar spaced inner sidewalls, a portable motor-driven mixer, means pivotally supporting said mixer above said sidewalls so as to be rockable about the axis of said cylindrically shaped bottom wall, said mixer supporting beaters depending therefrom to extend across essentially the width of the space between said sidewalls, and means for limiting the extent of rocking of the mixer about said pivot means, said mixer further having an upstanding handgrip portion the center line of which intersects the axis of said means pivotally supporting the mixer, said handgrip portion including a thumb actuatable switch on its outer end, the center of gravity of said mixer being disposed along said center line and below said axis about which the mixer is pivotally supported.

8. The combination of claim 7 wherein said means pivotally supporting said mixer comprises vertical stanchions provided the two sides of the bowl which support pivot pins directed toward each other, and the mixer has bearing recesses in its two sides detachably receiving said pivot pins, the sides of said recesses and pivot pins being shaped to cooperatively limit the angle through which the mixer may be rocked on said pivot pins.

9. The combination of claim 7 wherein the bowl includes a removable cover, said cover having an opening in the top thereof and said means pivotally supporting the mixer comprises aligned pivot pins supported on the two opposed edges by the cover, the mixer being mounted in said opening and having recesses in its two sides which rest on said pivot pins to accommodate rocking supports of the mixer.

10. The combination of claim 9, wherein at least one of the pivot pins and recesses have sloping sides which cooperatively limit the rocking of the mixer about said pivot pins to an angle corresponding to the arc of the cylindrical bottom wall.

11. The combination of claim 7 wherein the means pivotally supporting the mixer comprises a pair of aligned horizontally disposed pivot portions on the two sides of the mixer and the bowl has a pair of spaced aligned bearing recessed portions which receive said pivot portions and support the mixer for rocking movement about the horizontal axis thereof.

12. In combination, a mixing bowl and an electric mixer having beaters depending therefrom, said bowl having aligned spaced pivot means defining a horizontal axis and the mixer having bearing recesses which seat on said pivot means and by means of which the mixer is detachably mounted for rocking movement about said horizontal axis with the beaters extending into the bowl, the interior of said bowl having a curved bottom surface corresponding generally to the radius and width of the arcuate path through which the lower edge and sides of the beaters move when the mixer is rocked on said pivot means, said pivot means having converging sides and the recesses having diverging sides which cooperatively limit rocking of the mixer about said pivot means to an angle corresponding to the extent of said curved bottom surface of the bowl.

13. The combination of claim 12 wherein the sides of the recesses and pins limit rocking of the mixer on the pivot means to an angle of ninety degrees.

14. For an electric mixer, a mixing bowl having an open top, a pair of spaced sidewalls the inner surfaces of which are generally vertical and planar, a bottom wall the inner surface of which is of generally cylindrical concave shape, and pivot means supported by said sidewalls located essentially at the axis of said cylindrically shaped bottom wall, said axis being located above and at right angles to the planar surfaces of said sidewalls.

15. For use with an electric mixer, a bowl the interior of which has a generally cylindrically shaped concave bottom surface and a pair of spaced upstanding generally planar side surfaces, a pair of spaced axially aligned pivot means supported one above each said upstanding planar side surfaces on which to support an electric mixer for rocking movement of its beaters between said planar side surfaces, said pivot means defining a pivotal axis approximating the axis of said generally cylindrical bottom surface of the bowl, and means which limit the angle through which the mixer may be rocked on said pivot means.

16. For use with an electric mixer, a bowl, the interior of which includes a concave bottom wall of generally cylindrical shape, and opposed end and side walls which blend into said bottom wall, at least the opposed sidewalls having a generally upstanding planar shape through the major area thereof adjacent said bottom wall, said bowl further having means adjacent its top on which to support an electric mixer for rocking movement of its beaters between said sidewalls and about an axis approximately that of the cylindrical bottom wall.

17. An electric mixer bowl as claimed in claim 16 wherein the mentioned means comprises a cover for the bowl having a central opening in the top thereof and a pair of spaced aligned pivots on which corresponding recesses in the electric mixer rest for rocking support of the mixer.

18. For use with an electric mixer, a bowl the interior of which includes a concave bottom wall of generally cylindrical shape and a pair of opposed upstanding generally planar walls, said bowl having means adjacent its top on which to rest an electric mixer with its beaters depending between said side walls, said means constituting pivots about which the mixer may be rocked to swing its beaters along an arcuate path following the arcuate shape of the bottom wall and between the upstanding generally planar sidewalls of the bowl.

19. The bowl for an electric mixer claimed in claim 18 wherein the bowl has a pair of stanchions rising vertically from said generally planar walls and the upper ends of which are recessed to form said pivots on which the electric mixer rests.

20. For use with an electric mixer, a bowl having an outer wall including pedestal means by which to rest the bowl on a working surface and an inner wall which includes a concave bottom of generally cylindrical shape spaced above said working surface when rested thereon, said inner wall further including a pair of vertically extending opposed ends and sides which blend into said bottom of the inner wall, at least the opposed sides of said inner wall having a generally upstanding planar shape through the major area thereof adjacent said bottom wall, said bowl further having means adjacent its top on which to support an electric mixer for rocking movement of its beaters between said planar sides of the inner wall and about an axis approximately that of the cylindrical bottom of said inner wall.

21. The bowl for an electric mixer claimed in claim 20 wherein said bowl also includes a transparent cover with a central opening through which an electric mixer is adapted to extend when properly supported on said bowl for rocking movement.

22. The bowl for an electric mixer claimed in claim 21 wherein the cover is provided with said means on which to support an electric motor for rocking movement.

References Cited by the Examiner

UNITED STATES PATENTS

| | | | |
|---|---|---|---|
| 1,489,182 | 4/1924 | Weinberg | 259 |
| 2,103,922 | 12/1937 | Van Guilder | 259 |
| 2,804,288 | 8/1957 | O'Russa | 259 |

CHARLES A. WILLMUTH, *Primary Examiner.*